Patented May 3, 1927.

1,626,700

UNITED STATES PATENT OFFICE.

EDWARD ROBERT SCHMID, OF VERONA, NEW JERSEY, ASSIGNOR TO WESTINGHOUSE LAMP COMPANY, A CORPORATION OF PENNSYLVANIA.

BASING CEMENT.

No Drawing.   Application filed February 27, 1922.   Serial No. 539,755.

This invention relates to an adhesive composition and more particularly to a cement which may be employed for securing a metallic base to the glass bulb of an incandescent electric lamp.

An object of the invention is to provide an effective and economically manufactured heat-resistant cement.

Another object of the invention is the provision of a plastic adhesive composition which may be maintained in its plastic state for a considerable length of time under atmospheric conditions.

Although my cement may have other uses, it is particularly adapted for securing the base to a bulb of an electric incandescent lamp and will hereinafter be termed a basing cement. A cement for this purpose must possess a property which will make it adhere to metal and glass in a high degree and my composition has this necessary adhesive property as well as others which will hereinafter be set forth.

One of the basing cements which is at present used to a considerable extent includes bakelite as its principal binder. This cement, when used in incandescent lamp manufacture, requires a high heat treatment, to make it take a permanent set, which results in a discoloration from oxidation of an appreciable amount of bases. Before such discolored bases are salable they much be cleaned, which obviously increases the cost of production. Furthermore, when bakelite is employed as above mentioned, it has been considered necessary to prepare the cement by mixing the several ingredients when in a dry powdered state and then adding a solvent. The operation of dry mixing causes considerable inconvenience, inasmuch as the flying particles of the substance are detrimental to the health of the workman and great care must be exercised to prevent the workman from inhaling the finely divided matter.

The above disadvantages are avoided by my invention which also possesses other advantages which will hereinafter be set forth.

A basing cement must possess certain qualities peculiar to the use to which it is put, and the conditions under which it is handled.

A brief outline of the manner in which a cement of this character is employed will be given in order that the reader may appreciate more fully the value of a cement which has the necessary adhesive property and which will remain plastic for several days under normal atmospheric conditions.

Automatic machines are usually employed for applying a base to the bulb of a lamp and certain types of such machines necessitate the prefilling of the bases, i. e., a given amount of cement is squirted into each base, a plurality of such bases being arranged upon a tray for convenient handling. These trays, with the filled bases thereon, are disposed adjacent the automatic machines within reach of the operator who inserts a base in the machine and then juxtaposes a bulb in such manner with respect to the base that the cement may be firmly compressed between the base and the bulb by an actuation of the machine. The parts, after compression, are moved into and through an oven to effect a volatilization of one of the ingredients of the cement, thus causing it to become hardened or baked and to be firmly secured to the metal base and the glass bulb, thus bonding these two parts together.

As it is desirable, as a matter of economy, to prefill a large number of the bases with cement preparatory to their application to the basing machine, and as considerable time passes before the supply is exhausted, it will be obvious that it is important to provide a cement which retains its plastic condition until the bases are applied to the bulb, all other conditions being equal.

When a quantity of cement made in accordance with the present invention is disposed within a base and permitted to stand for a short interval of time, a thin nonporous film or skin forms on the surface of the composition, thereby entrapping the main portion and preventing it from further volatilization. It is apparent, therefore, that bases may be prefilled in desirable quantities and, as needed, applied to the machine. This permits the continuous operation of a basing machine.

The composition which I employ and which gives the desired results is produced by the admixture, in suitable proportions, of a volatile solvent such as alcohol, methyl alcohol, denatured alcohol No. 1 or 5, a rosin or substance, such as shellac, which is soluble in alcohol or the solvent employed, and an inert and finely divided filler as, for instance, marble flour, ground feldspar, ground barytes or other inorganic filler.

For the purpose of hastening the dividing action of the solvent, a relatively small amount of rosin or other suitable substance such for example as sandarac resin or acaroid resin is included in the mixture.

By combining the above ingredients in the proper proportions, a plastic composition may be obtained which will retain its plastic state for at least several days under normal atmospheric conditions because of the above mentioned film which forms on the surface thereof. By the addition of a substance which will effect an acceleration of the action of the solvent, the formation of the film is quickened.

Although I may use any suitable gum of the resinous group, I find that good results are obtained when shellac is used, with other ingredients, as illustrated by the following formula:

|  | Per cent. |
|---|---|
| Shellac | 11.9 |
| Rosin | 3.1 |
| Marble flour | 85.0 |

For the preparation of a cement according to the above formula, the several ingredients given are ground to a fine powder and are then thoroughly mixed, a sufficient amount of alcohol being added to give the proper doughy consistency to the mixture.

The following formula is another example of a cement from which good results have been obtained.

|  | Per cent. |
|---|---|
| Albertol | 11.9 |
| Rosin | 3.1 |
| Marble flour | 85.0 |

These ingredients are ground to a fine powder and are thoroughly mixed together with a sufficient amount of alcohol to give a mixture of the proper consistency. By employing albertol or other synthetic gum in the place of shellac an equally efficient cement is obtained but at a considerably reduced cost.

If a cement having a high degree of temperature resistance is desired, any high-temperature-resistance material as, for instance, bakelite, may be added to the composition. A cement of this character, from which good results have been obtained, may be compounded from the following formula:

|  | Per cent. |
|---|---|
| Shellac | 6.0 |
| Bakelite | 6.0 |
| Rosin | 2.5 |
| Marble flour | 85.5 |

These ingredients are finely ground and then mixed with a sufficient amount of a volatile solvent, such as alcohol, until a plastic mixture of the desired plasticity is obtained.

The inclusion of a relatively small amount of bakelite with the other ingredients of my composition increases the temperature resistance of the composition with comparatively small additional cost.

Although my cement is particularly adapted for use in securing bases to bulbs of incandescent lamps, it is obvious that it may have a more general application as a temperature resistance cement. It is also to be understood that, by soluble resins, I mean to include, shellac, or other substances having similar properties.

What is claimed is:

1. A cement consisting of shellac, alcohol, an inorganic inert filler, and a relatively small amount of rosin to effect an acceleration of the rate of solution of the shellac in the alcohol.

2. A cement consisting of shellac and bakelite in equal proportions, an inorganic inert filler, alcohol for dissolving said shellac and bakelite and rosin for hastening a film on the surface of the cement to prevent relatively rapid hardening of the major portion thereof.

3. A cement consisting of shellac and bakelite in equal proportions, an inorganic inert filler, alcohol for dissolving said shellac and bakelite and a lesser proportion of rosin than either the shellac or bakelite for hastening the formation of a film on the cement to prevent relatively rapid hardening of the major portion thereof.

4. A cement consisting of the following substances substantially in the proportion by weight indicated: shellac about 11.9%, rosin about 3.1%, marble flour about 85% and a water soluble volatile solvent in suitable proportion to produce a plastic mixture.

5. A cement consisting of the following substances substantially in the proportion by weight as indicated: shellac about 6.0%, bakelite about 6.0%, rosin about 2.5%, marble flour about 85.5% and a water soluble volatile solvent in suitable proportion to produce a plastic mixture.

In testimony whereof, I have hereunto subscribed my name this 25th day of February 1922.

EDWARD ROBERT SCHMID.